United States Patent
Newcombe et al.

(10) Patent No.: US 11,132,834 B2
(45) Date of Patent: Sep. 28, 2021

(54) PRIVACY-AWARE ARTIFICIAL REALITY MAPPING

(71) Applicant: Facebook Technologies, LLC, Menlo Park, CA (US)

(72) Inventors: Richard Andrew Newcombe, Seattle, WA (US); Yuheng Ren, Bothell, WA (US); Yajie Yan, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/537,071

(22) Filed: Aug. 9, 2019

(65) Prior Publication Data
US 2021/0042994 A1 Feb. 11, 2021

(51) Int. Cl.
| | |
|---|---|
| *G06T 17/05* | (2011.01) |
| *G06T 19/00* | (2011.01) |
| *H04L 29/06* | (2006.01) |
| *G06T 5/50* | (2006.01) |
| *G06T 7/33* | (2017.01) |

(52) U.S. Cl.
CPC .......... *G06T 17/05* (2013.01); *G06T 5/50* (2013.01); *G06T 7/33* (2017.01); *G06T 19/006* (2013.01); *H04L 63/0428* (2013.01); *G06T 2207/20221* (2013.01)

(58) Field of Classification Search
CPC .......... G06T 17/05; G06T 19/006; G06T 17/00–17/30; G06T 5/50; G06T 2207/20221; G06T 7/33; H04L 63/0428; G06F 3/011; G06F 3/013
See application file for complete search history.

(56) References Cited

U.S. PATENT DOCUMENTS

| | | | |
|---|---|---|---|
| 9,854,206 B1* | 12/2017 | Ren | H04N 7/147 |
| 2013/0174213 A1* | 7/2013 | Liu | G06T 19/006 |
| | | | 726/1 |
| 2013/0222369 A1* | 8/2013 | Huston | H04N 9/8205 |
| | | | 345/419 |
| 2015/0123973 A1* | 5/2015 | Larsen | G06T 17/20 |
| | | | 345/427 |

(Continued)

OTHER PUBLICATIONS

Nocerino, Erica, et al. "3D reconstruction with a collaborative approach based on smartphones and a cloud-based server." International Archives of the Photogrammetry, Remote Sensing and Spatial Information Sciences 42.W8 (2017): 187-194. (Year: 2017).*

(Continued)

*Primary Examiner* — Daniel F Hajnik
(74) *Attorney, Agent, or Firm* — FisherBroyles, LLP

(57) ABSTRACT

The disclosed computer-implemented method may include receiving, from a first device in an environment, real-time data associated with the environment and generating map data for the environment based on the real-time data received from the first device. The method may include creating, by merging the map data of the first device with aggregate map data associated with at least one other device, a joint anchor graph that is free of identifiable information, and hosting the joint anchor graph for a shared artificial reality session between the first device and the at least one other device. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2015/0143459 A1* | 5/2015 | Molnar | ............... | G06F 21/60 |
| | | | | 726/2 |
| 2016/0337599 A1* | 11/2016 | Williams | ............ | H04W 64/00 |
| 2017/0140144 A1* | 5/2017 | Bock | ............... | G06Q 20/3276 |
| 2018/0122137 A1* | 5/2018 | Tian | ..................... | G06T 15/08 |
| 2019/0114802 A1* | 4/2019 | Lazarow | ............ | G06F 1/163 |
| 2019/0325604 A1* | 10/2019 | Fink | .................... | G06T 7/593 |

OTHER PUBLICATIONS

Golodetz, Stuart, et al. "Collaborative large-scale dense 3d reconstruction with online inter-agent pose optimisation." IEEE transactions on visualization and computer graphics 24.11 (2018): 2895-2905. (Year: 2018).*

* cited by examiner

PRIVACY-AWARE ARTIFICIAL REALITY MAPPING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
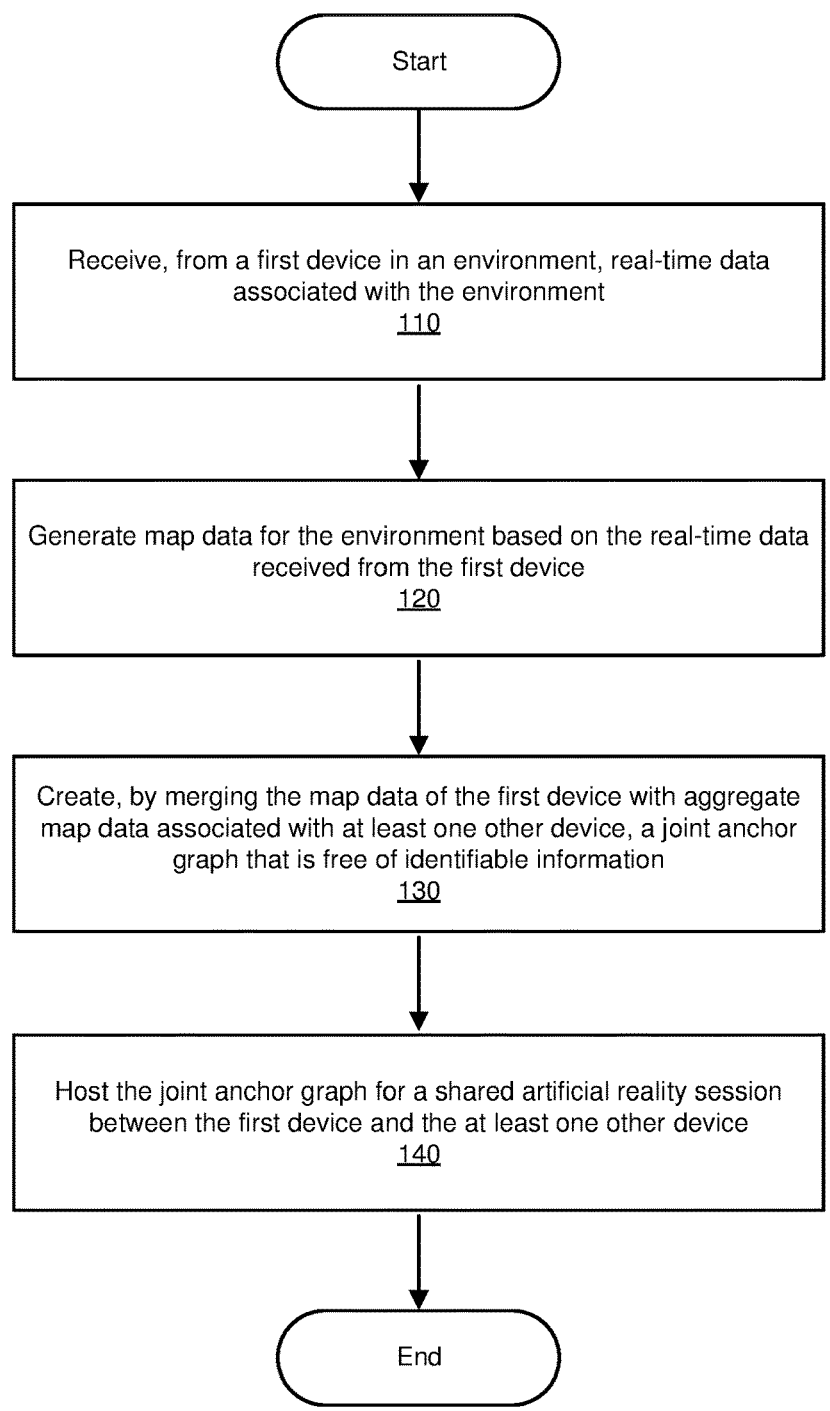
FIG. 1 is a flow diagram of an exemplary method for privacy-aware artificial reality mapping.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality devices (which may include augmented, virtual, and/or mixed-reality devices) typically augment or replace a user's real-world environment with computer-generated information. For example, an artificial reality device may alter a user's perception of his or her real-world environment by overlaying visual information onto the user's normal view. By doing so, artificial reality devices may provide an immersive experience for end users without completely replacing the user's view of their real-world environment.

Artificial reality devices may be used for games and other interactive applications between multiple users. Artificial reality applications often display virtual objects as if the virtual objects were in the real world, allowing users to interact with the virtual objects in the context of their own respective environments. In order to juxtapose virtual objects and interactions with the user's real-world perception, the artificial reality device may map the user's real-world environment. In some cases, the artificial reality application may share the mapped user environment with other users as part of a joint experience, such as a joint virtual location. However, the user may not wish for certain private environments, such as a bedroom or office, to be mapped and publicly disseminated by the artificial reality application.

The present disclosure is generally directed to a privacy-aware artificial reality mapping system. As will be explained in greater detail below, embodiments of the present disclosure may generate artificial reality mapping data that is free of identifiable information. In one example, an artificial reality mapping system may receive real-time data from devices in respective environments. The artificial reality mapping system may then generate map data from the real-time data and merge the map data to create a joint anchor graph that is free of identifiable information. By hosting this joint anchor graph, the artificial reality mapping system may provide shared mapping between users without having to reveal identifiable information from the mapping. This system may also improve the functioning of a computing device by reducing resources needed to host artificial reality maps, including reducing communication bandwidth required for relocalization and other mapping updates for all users. The system may further improve mapping technology by providing a system capable of selective real-time mapping. In addition, the system may improve artificial reality technology by enabling privacy awareness.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
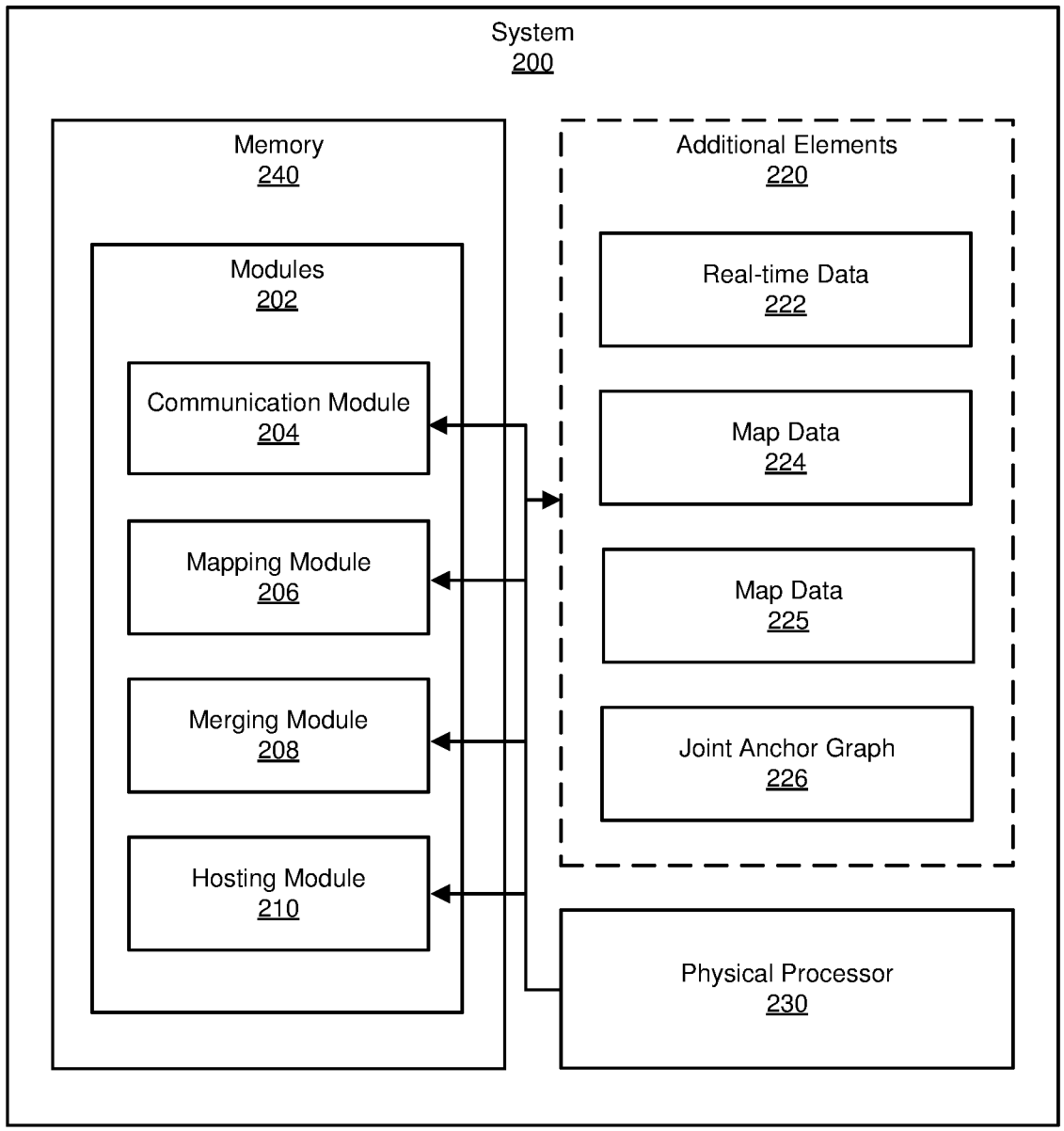
FIG. 2 is a block diagram of an exemplary system for privacy-aware artificial reality mapping.
Figure 3:
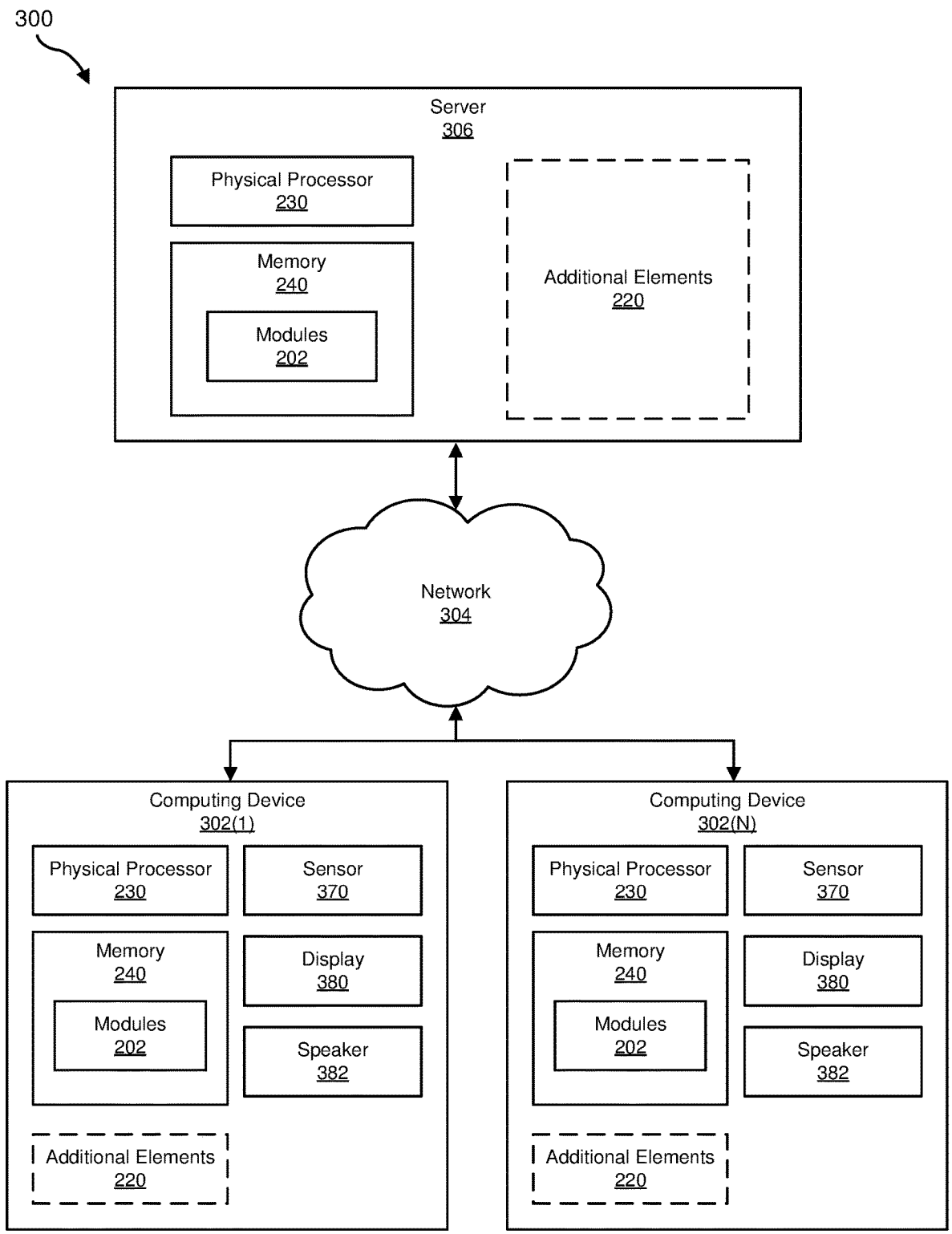
FIG. 3 is a block diagram of an exemplary network for privacy-aware artificial reality mapping.
Figure 4:
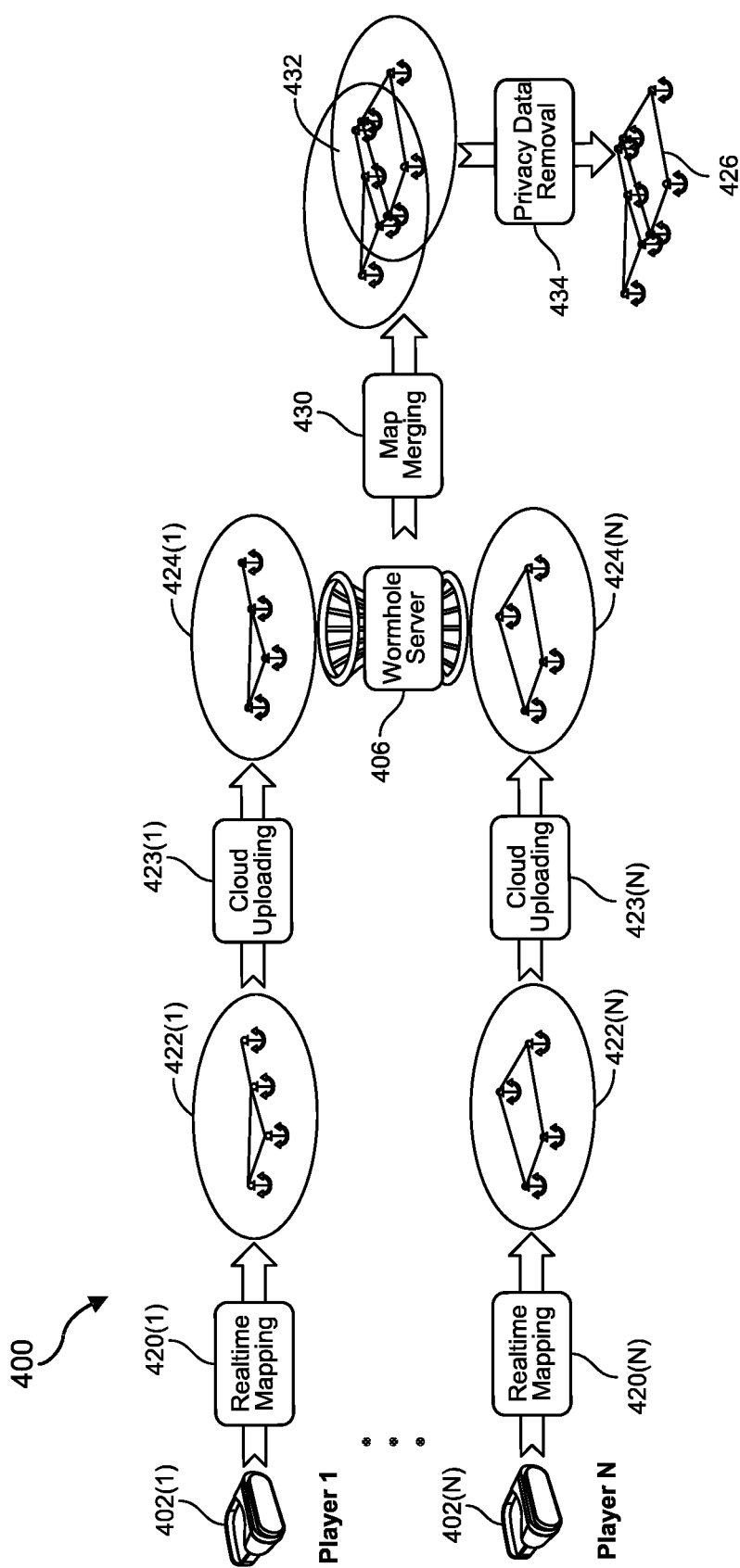
FIG. 4 is a diagram of an exemplary pipeline for a privacy-aware artificial reality mapping system.
Figure 5A:
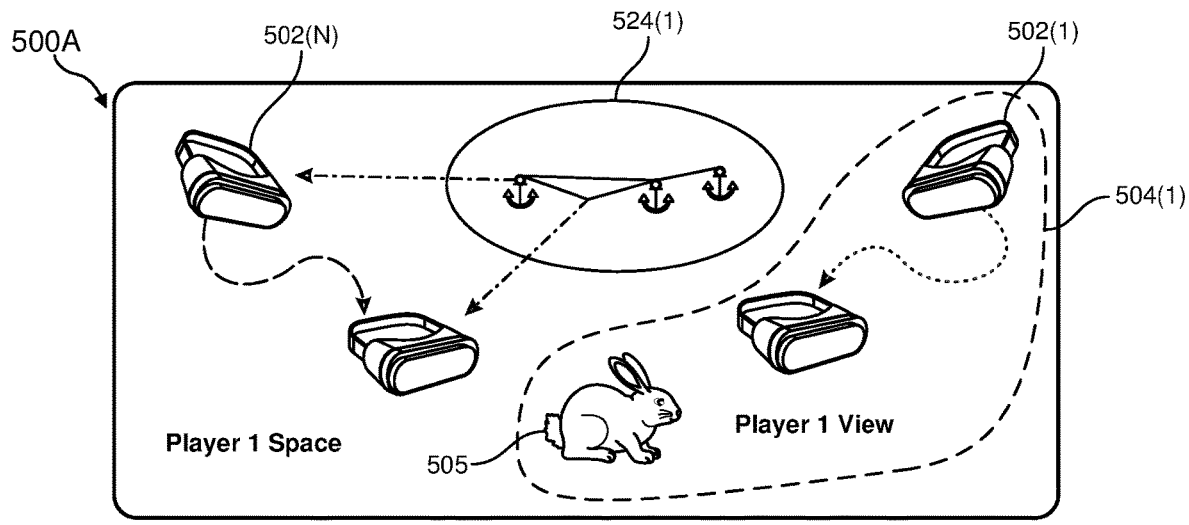
FIG. 5A-C are exemplary localized views of a privacy-aware artificial reality mapping system.
Figure 5B:
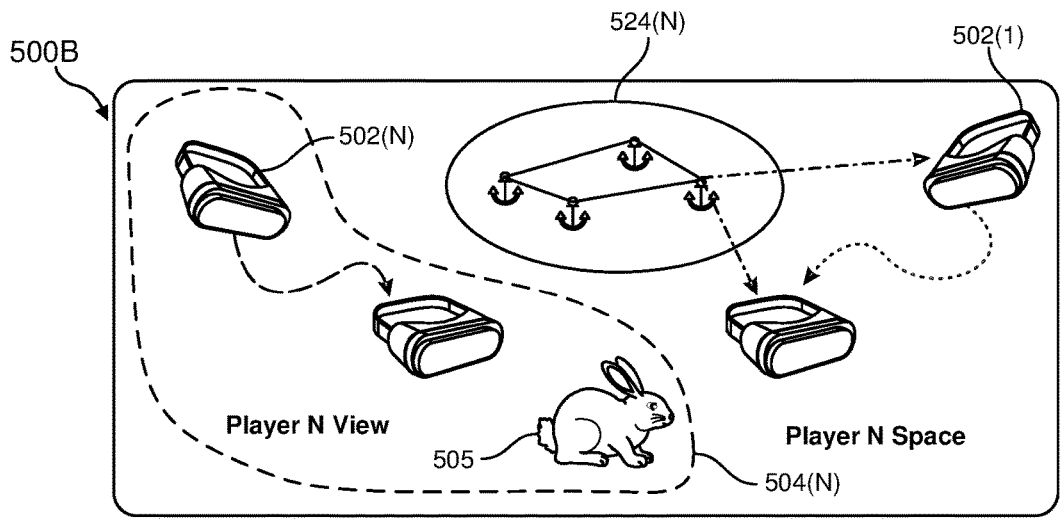
Figure 5C:
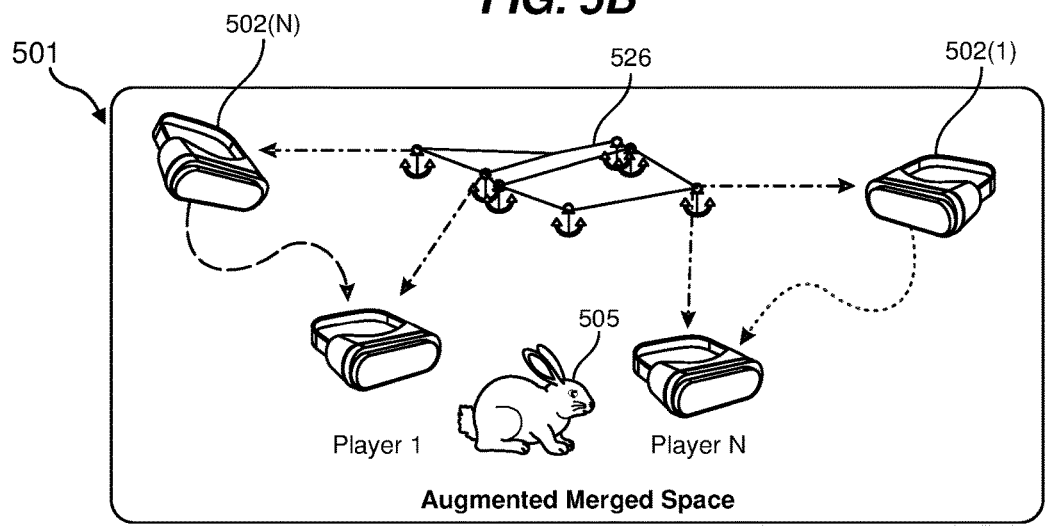
Figure 6:
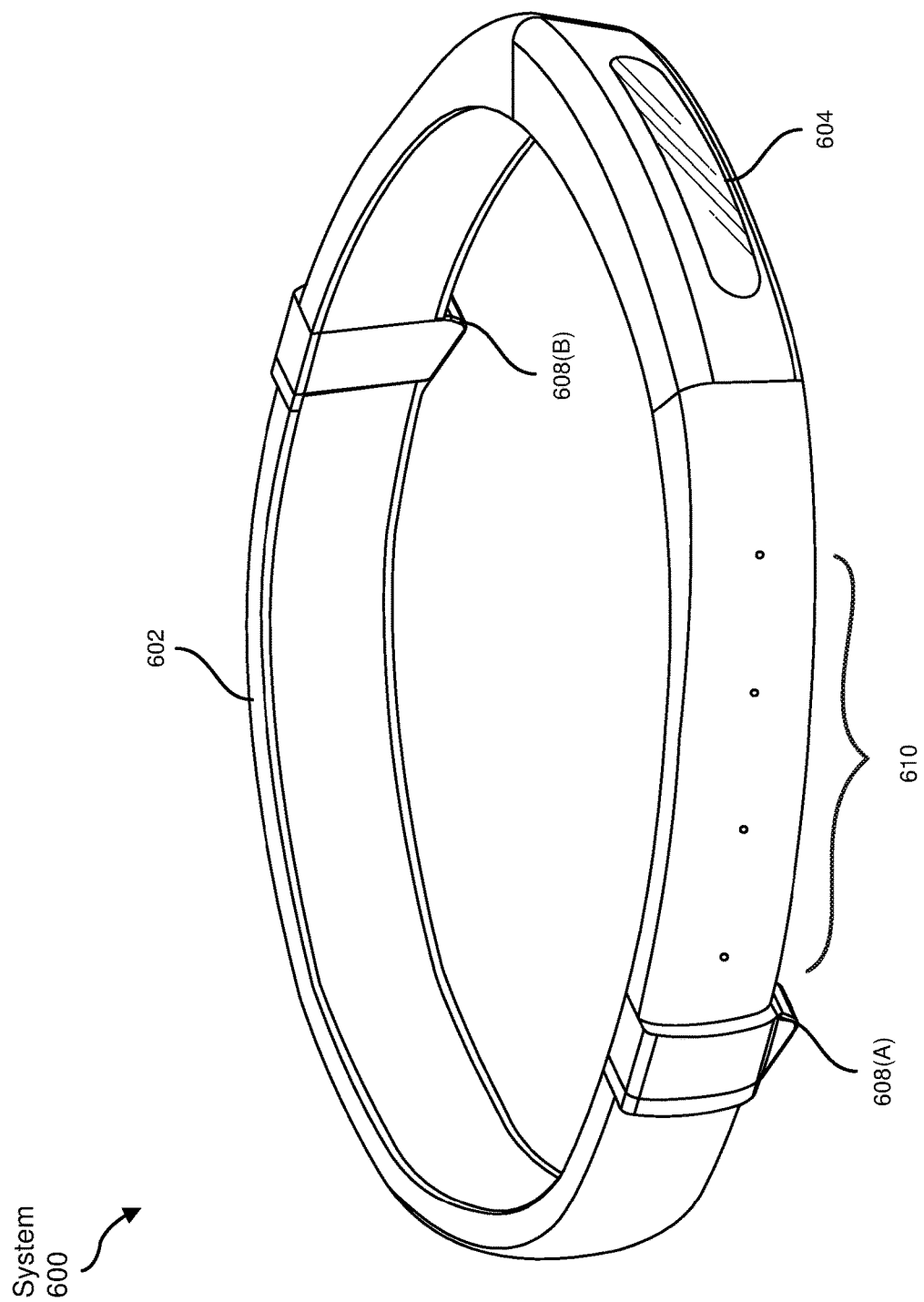
FIG. 6 is an illustration of an exemplary artificial-reality headband that may be used in connection with embodiments of this disclosure.
Figure 7:
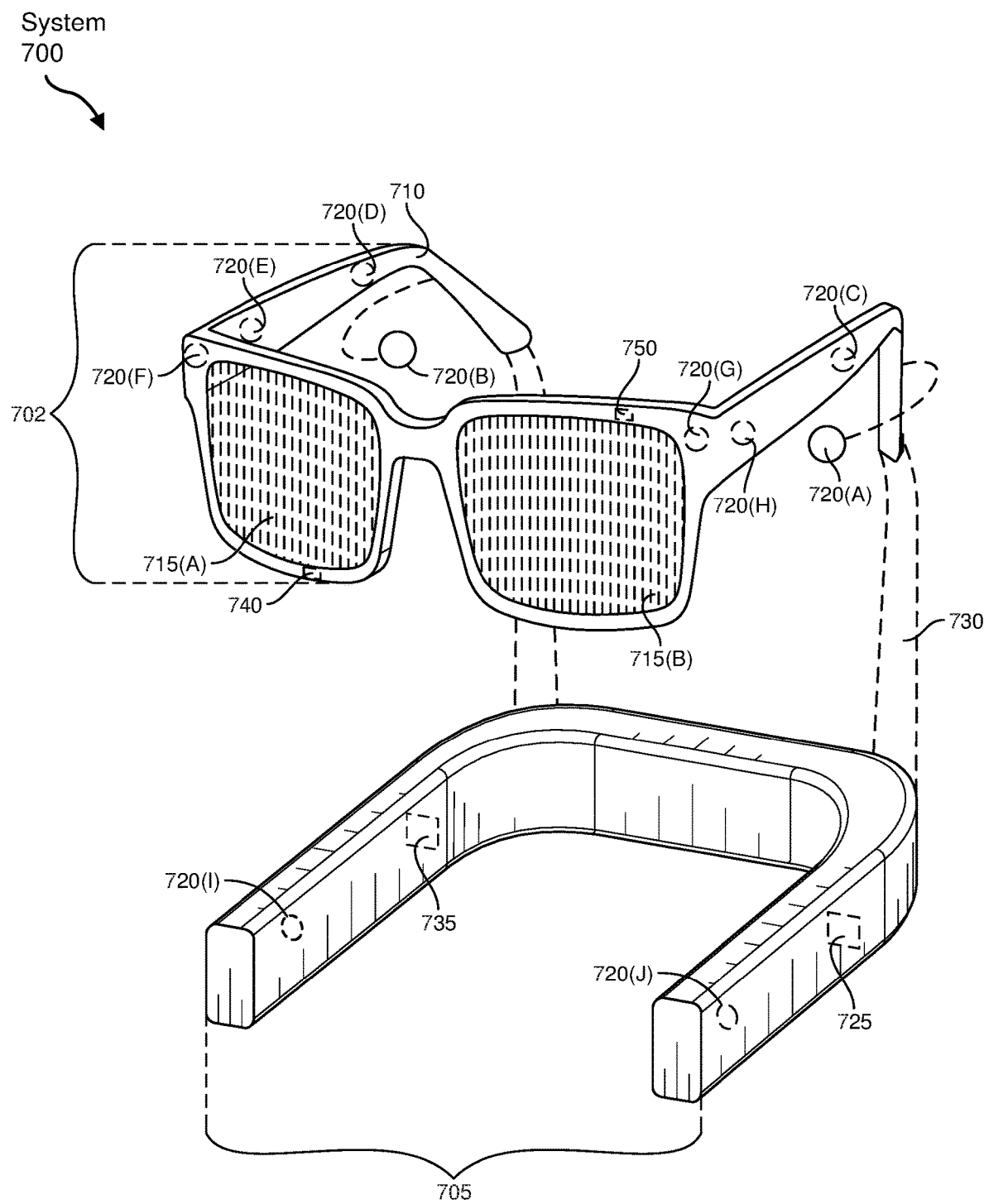
FIG. 7 is an illustration of exemplary augmented-reality glasses that may be used in connection with embodiments of this disclosure.
Figure 8:
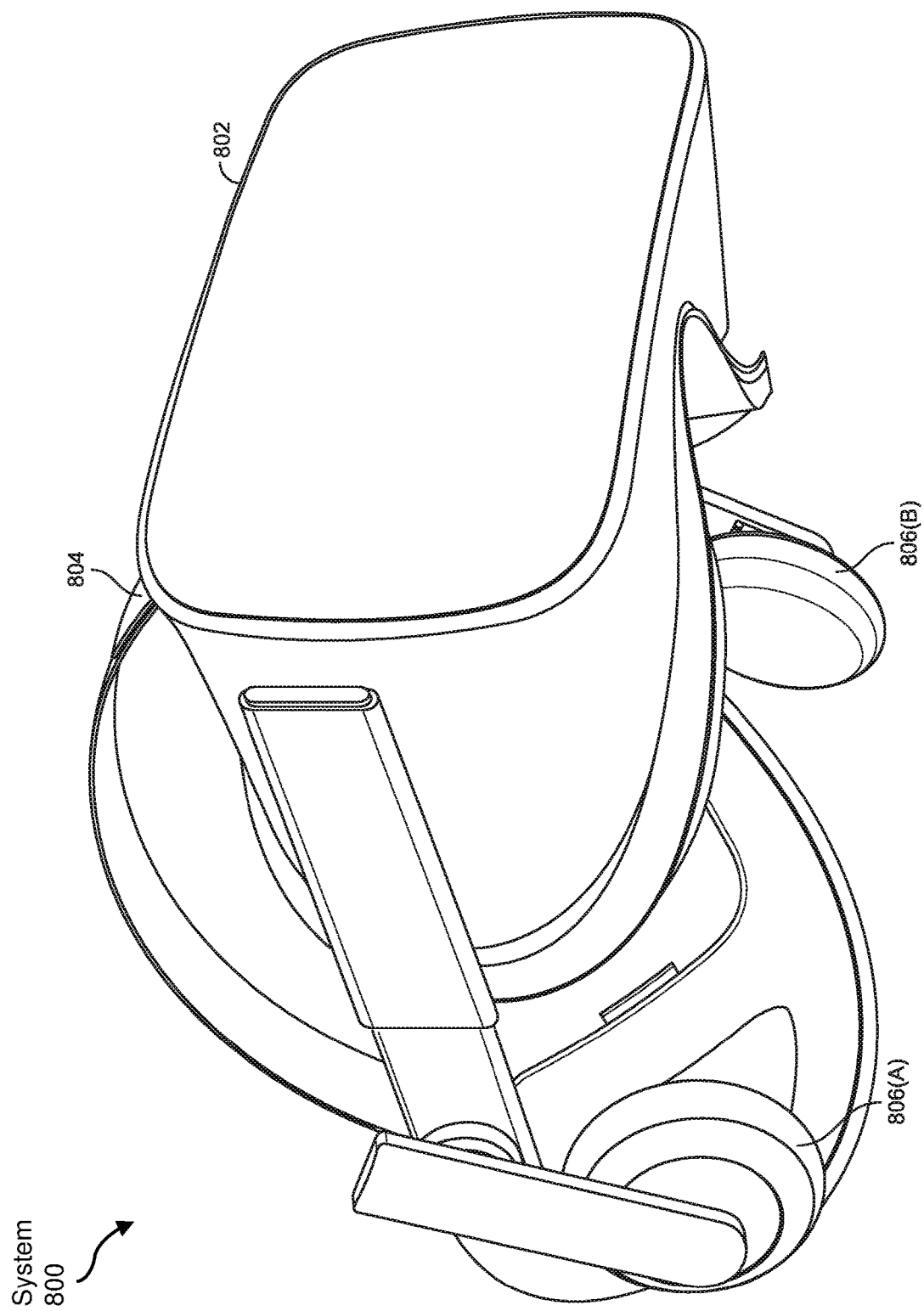
FIG. 8 is an illustration of an exemplary virtual-reality headset that may be used in connection with embodiments of this disclosure.

The following will provide, with reference to FIGS. 1-8, detailed descriptions of systems and methods of privacy-aware artificial reality mapping. The following will detail an exemplary process of privacy-aware artificial reality mapping in FIG. 1. FIG. 2 depicts an exemplary privacy-aware artificial reality mapping system. FIG. 3 depicts an exemplary network environment for the privacy-aware artificial reality mapping system. FIG. 4 depicts an exemplary data pipeline for a privacy-aware artificial reality mapping system. FIGS. 5A-C depict exemplary player spaces relating to mapping data maintained by a privacy-aware artificial reality mapping system. FIGS. 6-8 depict an exemplary event graph of an AR mapping system.

FIG. 1 is a flow diagram of an exemplary computer-implemented method 100 for privacy-aware artificial reality mapping. The steps shown in FIG. 1 may be performed by any suitable computer-executable code and/or computing system, including the system(s) illustrated in FIG. 2 and/or FIG. 3. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may receive, from a first device in an environment, real-time data associated with the environment. For example, communication module 204 may receive real-time data 222.

In some embodiments, the term "real-time" may refer to an operation that occurs without significant and/or unavoidable delay. Real-time operations may be limited by, for instance, device sensor processing speeds, network communication speeds, system processing speeds, etc. Real-time data may include, without limitation, video data, audio data, timestamps, and/or other data based on sensor data from the environment.

Various systems described herein may perform step 110. FIG. 2 is a block diagram of an example system 200 for privacy-aware artificial reality mapping. As illustrated in this figure, example system 200 may include one or more modules 202 for performing one or more tasks. As will be explained in greater detail below, modules 202 may include a communication module 204, a mapping module 206, a merging module 208, and a hosting module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing devices 302(1)-(N) and/or server 306). One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as real-time data 222, map data 224, map data 225, and joint anchor graph 226. Real-time data 222, map data 224, map data 225, and/or joint anchor graph 226 may be stored on a local storage device, such as memory 240, or may be accessed remotely. Real-time data 222 may represent data received from devices in an environment, as will be explained further below. Real-time data 222 may also, in certain implementations, include data relating to a source device of the real-time data 222. Map data 224 may represent map data derived from real-time 222. Map data 225 may represent map data that may be previously generated or generated concurrently with map data 225 and may not be generated from real-time data 222. Map data 225 may include, for instance, aggregated map data from various devices. Joint anchor graph 226 may represent abstracted map data and may exclude private, identifiable, and/or otherwise sensitive data, as will be explained further below.

Map data 224 and/or 225 may include data corresponding to mapping data of environments corresponding to source devices for map data 224 and/or 225. Map data 224 and/or 225 may include data regarding static features of the environment, including but not limited to walls, floors, ceilings, windows, doors, large tables, etc. Map data 224 and/or 225 may further include coordinate data for the static features, which may define locations of the static features. A coordinate system for the coordinate data may be relative, such as coordinates with respect to a specific point in the environment. For example, if the environment covered by the mapping system is limited to a single floor or level of a building, the coordinate data may be defined relative to a specific point on the level. Alternatively, the coordinate system may be global, such as defined by latitude and longitude. In addition, the coordinate system may include more than two dimensions. The coordinate system may also be 3D and may include height locations for the features.

Example system 200 in FIG. 2 may be implemented in a variety of ways. For example, all or a portion of example system 200 may represent portions of example network environment 300 in FIG. 3.

FIG. 3 illustrates an exemplary network environment 300 implementing aspects of the present disclosure. The network environment 300 includes computing devices 302(1)-(N), a network 304, and server 306. Computing device 302 may be a client device or user device, such as an artificial reality system (e.g., augmented-reality system 600 in FIG. 6, augmented-reality system 700 in FIG. 7, virtual-reality system 800 in FIG. 8), a desktop computer, laptop computer, tablet device, smartphone, or other computing device. Computing device 302 may include a physical processor 330, which may be one or more processors, memory 340, which may store data such as real-time data 222, a sensor 370 capable of detecting real-time data 222 from the environment, and a display 380. In some implementations, computing device 302 may represent an augmented reality device such that display 380 overlays images onto a user's view of his or her local environment. For example, display 380 may include a transparent medium that allows light from the user's environment to pass through such that the user may see the environment. Display 380 may then draw on the transparent medium to overlay information. Alternatively, display 380 may project images onto the transparent medium and/or onto the user's eyes. Computing device 302 may also include, in some implementations, a speaker 382 for sound output.

Sensor 370 may include one or more sensors, such as a camera, a microphone, and other sensors capable of detecting features and/or objects in the environment. Computing device 302 may be capable of collecting real-time data 222 using sensor 370 for sending to server 306.

Server 306 may represent or include one or more servers capable of hosting a mapping system. The mapping system may process real-time data 222, which may be from computing devices 302(1)-(N), map data 224, and/or map data 225 to build, maintain, and/or update joint anchor graph 226. In some examples, the mapping system may represent an artificial-reality mapping system, which may process data for display on artificial reality devices. The server 306 may include a physical processor 330, which may include one or more processors, memory 340, which may store modules 202, and additional elements 220, such as real-time data 222, map data 224, map data 225, and/or joint anchor graph 226.

Computing device 302 may be communicatively coupled to server 306 through network 304. Network 304 may represent any type or form of communication network, such as the Internet, and may comprise one or more physical connections, such as LAN, and/or wireless connections, such as WAN.

Returning to FIG. 1, the systems described herein may perform step 110 in a variety of ways. In one example, communication module 204, as part of server 306, may receive, from computing devices 302 in an environment, real-time data 222 that may be associated with the environments. Real-time data 222 may be associated with objects in the environment, which may include inanimate objects, humans, and/or other recognizable objects detected by computing device 302. For instance, computing device 302 may be located in a user's apartment.

FIG. 4 shows an exemplary pipeline 400 depicting data flow for a privacy-aware mapping system. As shown in this figure, FIG. 4 may include a wormhole server 406, which may correspond to system 200 and/or server 306, and devices 402(1) and 402(N), which may respectively correspond to computing devices 302(1) and 302(N). Device 402(1) may initiate real-time mapping 420(1) and device 402(N) may initiate real-time mapping 420(N). FIG. 4 illustrates how real-time mapping may occur simultaneously and in parallel for devices 402(1) and 402(N).

Devices 402(1) and 402(N) may be in different physical locations. However, real-time mapping 420(1) and 420(N) may capture identifiable information from the physical locations. For example, a user may be using device 402(1) in his residence. As part of real-time mapping 420(1), device 402(1) may capture sensitive information such as image data of his bedroom, office, or other locations the user may not wish to be made public. Similarly, device 402(N) may capture sensitive information as part of real-time mapping 420(N). A user of device 402(N) may also be using device 402(N) in his residence.

In some examples, computing device 302 may encrypt real-time data 222 to further protect identifiable information which may be present in real-time data 222. In such examples, communication module 204 may receive, from computing device 302, a key for decrypting encrypted real-time data 222.

As illustrated in FIG. 1, at step 120 one or more of the systems described herein may generate map data for the environment based on the real-time data received from the first device. For example, mapping module 206 may generate map data 224 based on real-time data 222.

In some embodiments, the term "map data" may refer to data that represents a space or area. For instance, map data may define some or all physical boundaries encountered in a location, such as walls, doors, and/or other obstacles. In some examples, map data may be an abstraction of a real-world environment, such as a lower-dimensional (e.g., two-dimensional) representation of a three-dimensional (3D) space or a reduced representation of the 3D space. Map data may also include a reference coordinate system. The systems described herein may use map data for generating shared spaces between users in an artificial reality experience.

The systems described herein may perform step 120 in a variety of ways. In one example, mapping module 206 may determine three-dimensional points from map data 224. For instance, real-time data 222 may include image data from which mapping module 206 may identify points on surfaces of objects. Mapping module 206 may establish anchor points based on the 3D points. In some embodiments, the term "anchor points" may refer to spatial anchor points, such as corners of rooms, door boundaries, object endpoints, etc.

Mapping module 206 may recognize spatial anchor points from the 3D points. Mapping module 206 may also determine an anchor graph using the anchor points. In some embodiments, the term "anchor graph" may refer to a data set representing spatial anchor points. The anchor graph may be a further abstraction of a real-world environment. Map data 224 may include the anchor graph. FIG. 4 illustrates anchor graph 422(1) resulting from real-time mapping 420(1), and similarly anchor graph 422(N) resulting from real-time mapping 420(N). Anchor graph 422(1) may correspond to map data 224 and anchor graph 422(N) may correspond to map data 225. In some examples, map data 225 may also correspond to map data for various other devices.

Returning to FIG. 1, at step 130 one or more of the systems described herein may create, by merging the map data of the first device with aggregate map data associated with at least one other device, a joint anchor graph that is free of identifiable information. For example, merging module 208 may merge map data 224 with map data 225 to create joint anchor graph 226.

In some embodiments, the term "joint anchor graph" may refer to a resultant anchor graph after merging different anchor graphs. A joint anchor graph may not correspond to one or more discrete environments but instead represent a merging of the environments. For instance, joint anchor graph 226 may represent overlapping public areas of environments of computing devices 302(1) and 302(N). The users of devices 402(1) and 402(N) may be roommates having separate bedrooms in a shared apartment. Joint anchor graph 226 may include common areas, such as a living room, kitchen, etc., while omitting the users' respective bedrooms.

The systems described herein may create joint anchor graph 226 in a variety of ways. In one example, merging module 208 may select a subset of the anchor points from map data 224 and/or map data 225. Merging module 208 may select the anchor points based on a viewpoint of the environment. For instance, the viewpoint may be a viewpoint of computing device 302 in the environment or may be a viewpoint selected to optimize boundary determinations of a merged space. The anchor points may be selected based on similarity of structure such that the selected anchor points of map data 224 may be overlapped with the selected anchor points of map data 225. Alternatively, merging module 208 may randomly select anchor points.

Merging module 208 may discard anchor points that have not been selected. In some embodiments, the discarded anchor points may include and/or represent identifiable information. In some embodiments, joint anchor graph 226 may correspond to a globally consistent model that represents non-overlapping areas of the environments of computing device 302(1) and computing device 302(N) that have been spatially transformed for merging. Merging module 208 may transform the selected anchor points to merge anchor points that do not otherwise overlap. For example, merging module 208 may geometrically align an orientation and/or layout of two different rooms for merging.

If at step 110 computing device 302(1) had encrypted real-time data 222, computing device 302(1) may also send the key for decrypting real-time data 222. Merging module 208 may decrypt real-time data 222 using the key. Similarly, merging module 208 may decrypt other data such as real-time data and/or map data (e.g., map data 225) from other devices (e.g., computing device 302(N)) using keys received from the respective devices.

In FIG. 4, mapping data may be uploaded to wormhole server 406. Wormhole server 406 may be a server that may receive real-time data and synchronize data across multiple devices, as may be necessary for hosting artificial reality mapping systems. Wormhole server 406 may be a secure trusted server that has permission to access real-time data 222, map data 224, and/or map data 225. During cloud uploading 423(1), device 402(1) may provide keys or otherwise authorize wormhole server 406 to access anchor graph 424(1). Similarly, during cloud uploading 423(N), device 402(N) may provide keys or otherwise authorize wormhole server 406 to access anchor graph 424(N). Wormhole server 406 may perform map merging 430 to create merged anchor graph 432.

Wormhole server 406 may further perform privacy data removal 434 to create joint anchor graph 426, which may correspond to joint anchor graph 226. Privacy data removal 434 may include removal of identifiable information, such as image and/or audio data, metadata, timestamps, etc. In some implementations, map data, such as map data 224 and/or 225 may be discarded. Discarding map data 224 and/or 225 may further protect users' identifiable information from becoming public. Although FIG. 4 shows map merging 430 and privacy data removal 434 as separate operations, in other implementations map merging 430 and privacy data removal 434 may be a combined operation.

Turning back to FIG. 1, at step 140 one or more of the systems described herein may host the joint anchor graph for a shared artificial reality session between the first device and the at least one other device. For example, hosting module 210 may host joint anchor graph 226.

The systems described herein may perform step 140 in a variety of ways. In one example, hosting module 210, as part of server 306, may host joint anchor graph 226 such that server 306 may provide at least a portion of joint anchor graph 226 to computing devices 302(1) and 302(N) for the shared artificial reality session. Computing devices 302(1) and 302(N) may use joint anchor graph 226 for relocalization.

In some embodiments, the term "relocalization" may refer to a device determining its updated position and orientation in a real-world environment for updating its corresponding position and orientation with respect to an artificial reality environment. Traditionally, relocalization may require devices to send real-time data to essentially remap the device in the artificial reality environment. Traditional relocalization may further utilize a query/request communication to address asynchronization. Because the joint anchor graph is stripped of map data, updated real-time data may no longer be applicable to the joint anchor graph. Instead, devices may send its own pose data, which may include position and orientation data of six degrees-of-freedom (DOF). Thus, the systems described herein may advantageously avoid sending real-time data for relocalization and reduce an amount of identifiable data being transmitted as well as reduce network bandwidth required for relocalization.

FIGS. 5A-C illustrate localized views of a privacy-aware artificial reality mapping system for a device 502(1) and a device 502(N) which may be sharing an artificial reality session. FIG. 5A shows a space 500A that may be local to device 502(1), which may correspond to computing device 302(1). FIG. 5B shows a space 500B that may be local to device 502(N), which may correspond to computing device 302(N). FIG. 5C shows an augmented merged space 501, which may be represented by a joint anchor graph 526. Joint anchor graph 526 may correspond to joint anchor graph 226. Space 500A, space 500B, and augmented merged space 501 may include a virtual object 505. As devices 502(1) and 502(N) move within their respective real-world environments, an artificial reality mapping system, as implemented with server 306 for example, may track the new locations of devices 502(1) and 502(N) with respect to augmented merged space 501.

In FIG. 5A, device 502(1) may maintain its own local map 524(1), which may include virtual object 505 and a virtual representation of device 502(N). Local map 524(1) may correspond to an anchor graph or other map data associated with the real-world environment of device 502(1). As device 502(1) moves, device 502(1) may send pose data to the artificial reality mapping system. The pose data may include an identifier and 6DOF location/orientation information, although in other implementations the pose data may include other relevant data. The artificial reality mapping system may track a location of device 502(1) with respect to joint anchor graph 526 using the pose data. For example, the pose data may be translated with reference to one or more particular anchor points. As illustrated in FIG. 5C, the change in location of device 502(1) may be associated with a specific anchor point. The translated pose data may be sent to other devices in the artificial reality session (e.g., device 502(N)), to update local maps (e.g., local map 524(N)) with a new location of device 502(1) with respect to anchor graph 526. As seen in FIG. 5B, local map 524(N) for device 502(1) includes the specific anchor point and may therefore correctly update a relative location of device 502(1) in space 500B.

Similarly, as device 502(N) moves within its real-world environment, device 502(N) may send its pose data to the artificial reality mapping system. The artificial reality mapping system may translate the pose data with respect to specific anchor points in joint anchor graph 526, and send the tracked location of device 502(N) to device 502(1) to update local map 524(1). Thus, spaces 500(1) and 500(N) may be synchronized with respect to augmented merged space 501 despite different local maps 524(1) and 524(N).

In addition, each device 502(1) and 502(N) may maintain its own local map 524(1) and 524(N) respectively without having to share local maps. Moreover, the artificial reality mapping system may maintain joint anchor graph 526 such that joint anchor graph 526 may persist after the shared artificial reality session ends. For instance, if devices 502(1) and 502(N) initiate another shared artificial reality session in the same respective real-world environments, the artificial reality mapping system may not require recreating joint anchor graph 526. In other implementations, joint anchor graph 526 may be discarded after the shared artificial reality session ends.

Conventionally, a shared artificial reality experience may require a common map shared across all devices. The common map may be generated by mapping a user A's real-world environment, mapping a user B's real-world environment, and combining the two mappings. However, any private locations or identifiable features, such as visible objects, room layouts, etc., may be included in the common map. For example, A and B may be roommates sharing the same apartment. A and B may share the living room but have separate bedrooms. The common map may include the shared living room as an overlapping area, but A and B may not wish to share their own bedrooms as part of the common map.

Advantageously, the systems and methods herein do not utilize a conventional common map. The privacy-aware artificial reality mapping systems described herein may utilize a joint anchor graph which may be free of identifiable information. Any mapping data and other real-time data may be stripped away and abstracted into an anchor graph that includes spatial anchor points. The anchor graphs may be further abstracted, for instance by genericizing the anchor points. Conventionally, the anchor points may be based on key frames, which may be reverse engineered into identifiable information. The privacy-aware artificial reality mapping system may instead use 3D points. To further prevent reverse engineering, the privacy-aware artificial reality mapping system may randomly select anchor points.

The privacy-aware artificial reality mapping system may also advantageously reduce network bandwidth usage. Because the privacy-aware artificial reality mapping system track devices with respect to the joint anchor graph, the devices may update their own respective locations by sending pose data. Conventionally, each device may need to adhere to a relocalization procedure which may include queries to the server to address asynchronization issues. Conventional relocalization may require sending real-time data in order to map devices to the common map. In contrast, the privacy-aware artificial reality mapping system may not require such bandwidth-heavy communications. The privacy-aware artificial reality mapping system may track devices with respect to anchor points in the joint anchor graph such that pose data (which may include a numerical value for each of 6DOF along with an identifier) may provide sufficient location updates.

EXAMPLE EMBODIMENTS

Example 1: A computer-implemented method for privacy-aware artificial reality mapping may include: receiving, from a first device in an environment, real-time data associated with the environment; generating map data for the environment based on the real-time data received from the first device; creating, by merging the map data of the first device with aggregate map data associated with at least one other device, a joint anchor graph that is free of identifiable information; and hosting the joint anchor graph for a shared artificial reality session between the first device and the at least one other device.

Example 2: The computer-implemented method of Example 1, further comprising: receiving pose data from the first device; tracking a location of the first device with respect to the joint anchor graph based on the pose data; and sending the tracked location of the first device to the at least one other device.

Example 3. The computer-implemented method of any of Examples 1-2, wherein generating the map data comprises: determining a plurality of three-dimensional (3D) points from the map data; and establishing a plurality of anchor points based on the plurality of 3D points.

Example 4. The computer-implemented method of Example 3, wherein creating the joint anchor graph comprises: selecting a subset of the plurality of anchor points; and discarding anchor points of the plurality of anchor points not selected in the subset.

Example 5. The computer-implemented method of any of Examples 3-4, wherein the step of selecting the subset of the plurality of anchor points is based on a viewpoint of the environment.

Example 6. The computer-implemented method of any of Examples 4-5, wherein the step of selecting the subset of the plurality of anchor points is based on random selection.

Example 7. The computer-implemented method of any of Examples 3-6, wherein creating the joint anchor graph comprises overlapping one or more anchor points of the plurality of anchor points with one or more anchor points associated with the aggregate map data.

Example 8. The computer-implemented method of any of Examples 1-7, wherein the real-time data received from the first device is encrypted.

Example 9. The computer-implemented method of Example 8, wherein creating the joint anchor graph further comprises: receiving, from the first device, a key for decrypting the encrypted real-time data; and decrypting the encrypted real-time data using the key.

Example 10. The computer-implemented method of any of Examples 1-9, wherein the joint anchor graph persists after the shared artificial reality session ends.

Example 11. The computer-implemented method of any of Examples 1-10, wherein the joint anchor graph represents overlapping public areas of environments of the first device and the at least one other device.

Example 12. The computer-implemented method of any of Examples 1-11, wherein the joint anchor graph comprises a globally consistent model that represents non-overlapping areas of the environments of the first device and the at least one other device that have been spatially transformed for merging.

Example 13. A system comprising: at least one physical processor; physical memory comprising computer-executable instructions that, when executed by the physical processor, cause the physical processor to: receive, from a first device in an environment, real-time data associated with the environment; generate map data for the environment based on the real-time data received from the first device; create, by merging the map data of the first device with aggregate map data associated with at least one other device, a joint anchor graph that is free of identifiable information; and host the joint anchor graph for a shared artificial reality session between the first device and the at least one other device.

Example 14. The system of Example 13, wherein the instructions further comprise instructions for: receiving pose data from the first device; tracking a location of the first device with respect to the joint anchor graph based on the pose data; and sending the tracked location of the first device to the at least one other device.

Example 15. The system of any of Examples 13-14, wherein generating the map data comprises: determining a plurality of three-dimensional (3D) points from the map data; establishing a plurality of anchor points based on the plurality of 3D points; selecting a subset of the plurality of anchor points, wherein creating the joint anchor graph comprises overlapping one or more anchor points of the plurality of anchor points with one or more anchor points associated with the aggregate map data; and discarding anchor points of the plurality of anchor points not selected in the subset.

Example 16. The system of Example 15, wherein the step of selecting the subset of the plurality of anchor points is based on a viewpoint of the environment.

Example 17. The system of any of Examples 13-16, wherein the real-time data received from the first device is encrypted, and creating the joint anchor graph further comprises: receiving, from the first device, a key for decrypting the encrypted real-time data; and decrypting the encrypted real-time data using the key.

Example 18. The system of any of Examples 13-17, wherein the joint anchor graph represents overlapping public areas of environments of the first device and the at least one other device.

Example 19. The system of any of Examples 13-18, wherein the joint anchor graph comprises a globally consistent model that represents non-overlapping areas of the environments of the first device and the at least one other device that have been spatially transformed for merging.

Example 20. A non-transitory computer-readable medium comprising one or more computer-executable instructions that, when executed by at least one processor of a computing device, cause the computing device to: receive, from a first device in an environment, real-time data associated with the environment; generate map data for the environment based on the real-time data; create, by merging the map data of the first device with aggregate map data associated with at least one other device, a joint anchor graph that is free of identifiable information; and host the joint anchor graph for a shared artificial reality session between the first device and the at least one other device.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 600 in FIG. 6. Other artificial-reality systems may include an NED that also provides visibility into the real world (e.g., augmented-reality system 700 in FIG. 7) or that visually immerses a user in an artificial reality (e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 6, augmented-reality system 600 generally represents a wearable device dimensioned to fit about a body part (e.g., a head) of a user. As shown in FIG. 6, system 600 may include a frame 602 and a camera assembly 604 that is coupled to frame 602 and configured to gather information about a local environment by observing the local environment. Augmented-reality system 600 may also include one or more audio devices, such as output audio transducers 608(A) and 608(B) and input audio transducers 610. Output audio transducers 608(A) and 608(B) may provide audio feedback and/or content to a user, and input audio transducers 610 may capture audio in a user's environment.

As shown, augmented-reality system 600 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 600 may not include an NED, augmented-reality system 600 may include other types of screens or visual feedback devices (e.g., a display screen integrated into a side of frame 602).

The embodiments discussed in this disclosure may also be implemented in augmented-reality systems that include one or more NEDs. For example, as shown in FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent a position sensor, an inertial measurement unit (IMU), a depth camera assembly, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

Augmented-reality system 700 may also include a microphone array with a plurality of acoustic transducers 720(A)-720(J), referred to collectively as acoustic transducers 720. Acoustic transducers 720 may be transducers that detect air pressure variations induced by sound waves. Each acoustic transducer 720 may be configured to detect sound and convert the detected sound into an electronic format (e.g., an analog or digital format). The microphone array in FIG. 2 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(1) and 720(J), which may be positioned on a corresponding neckband 705.

In some embodiments, one or more of acoustic transducers 720(A)-(F) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments, acoustic transducers 720(A) and 720(B) may be connected to augmented-reality system 700 via a wireless connection (e.g., a Bluetooth connection). In still other embodiments, acoustic transducers 720(A) and 720(B) may not be used at all in conjunction with augmented-reality system 700.

Acoustic transducers 720 on frame 710 may be positioned along the length of the temples, across the bridge, above or below display devices 715(A) and 715(B), or some combination thereof. Acoustic transducers 720 may be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers and other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(1) and 720(J)) that are part of the microphone array (or potentially form their own microphone subarray). Neckband 705 may also include a controller 725 and a power source 735.

Acoustic transducers 720(1) and 720(J) of neckband 705 may be configured to detect sound and convert the detected sound into an electronic format (analog or digital). In the embodiment of FIG. 7, acoustic transducers 720(1) and 720(J) may be positioned on neckband 705, thereby increasing the distance between the neckband acoustic transducers 720(1) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 600, augmented-reality system 700, and/or virtual-reality system 800 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 6 and 8, output audio transducers 608(A), 608(B), 806(A), and 806(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 610 may include condenser microphones, dynamic microphones, ribbon microphones, and/or any other type or form of input transducer. In some embodiments, a single transducer may be used for both audio input and audio output.

While not shown in FIGS. 6-8, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 600, 700, and 800 of FIGS. 6-8, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive real-time data to be transformed, transform the real-time data, use the result of the transformation to generate a joint anchor graph, and store the result of the transformation to synchronize virtual location data across various devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, from a first device in an environment, real-time data associated with the environment;
generating map data for the environment based on the real-time data received from the first device;
creating, by merging the map data of the first device with aggregate map data associated with at least one other device, a joint anchor graph that is free of identifiable information, wherein the identifiable information is omitted from the joint anchor graph by:
determining an overlapping area between the map data of the first device and the aggregate map data,
determining, based on at least the overlapping area, the identifiable information, wherein the identifiable information corresponds to a non-overlapping area,
discarding at least a portion of the map data of the first device corresponding to the non-overlapping area, and
spatially transforming a remaining portion of the map data of the first device corresponding to the non-overlapping area; and
hosting the joint anchor graph for a shared artificial reality session between the first device and the at least one other device.

2. The method of claim 1, further comprising:
receiving pose data from the first device;
tracking a location of the first device with respect to the joint anchor graph based on the pose data; and
sending the tracked location of the first device to the at least one other device.

3. The method of claim 1, wherein generating the map data comprises:
determining a plurality of three-dimensional (3D) points from the map data; and
establishing a plurality of anchor points based on the plurality of 3D points.

4. The method of claim 3, wherein creating the joint anchor graph comprises:
selecting a subset of the plurality of anchor points; and
discarding anchor points of the plurality of anchor points not selected in the subset.

5. The method of claim 4, wherein the step of selecting the subset of the plurality of anchor points is based on a viewpoint of the environment.

6. The method of claim 4, wherein the step of selecting the subset of the plurality of anchor points is based on random selection.

7. The method of claim 3, wherein creating the joint anchor graph comprises overlapping one or more anchor points of the plurality of anchor points with one or more anchor points associated with the aggregate map data.

8. The method of claim 1, wherein the real-time data received from the first device is encrypted.

9. The method of claim 8, wherein creating the joint anchor graph further comprises:
receiving, from the first device, a key for decrypting the encrypted real-time data; and
decrypting the encrypted real-time data using the key.

10. The method of claim 1, wherein the joint anchor graph persists after the shared artificial reality session ends.

11. The method of claim 1, wherein the joint anchor graph represents overlapping public areas of environments of the first device and the at least one other device.

12. The method of claim 1, wherein the joint anchor graph comprises a globally consistent model that represents non-overlapping areas of the environments of the first device and the at least one other device that have been spatially transformed for merging.

13. A system comprising:
at least one physical processor;
physical memory comprising computer-executable instructions that, when executed by the physical processor, cause the physical processor to:
receive, from a first device in an environment, real-time data associated with the environment;
generate map data for the environment based on the real-time data received from the first device;
create, by merging the map data of the first device with aggregate map data associated with at least one other device, a joint anchor graph that is free of identifiable information, wherein the identifiable information is omitted from the joint anchor graph by:
determining an overlapping area between the map data of the first device and the aggregate map data,
determining, based on at least the overlapping area, the identifiable information, wherein the identifiable information corresponds to a non-overlapping area,
discarding at least a portion of the map data of the first device corresponding to the non-overlapping area, and
spatially transforming a remaining portion of the map data of the first device corresponding to the non-overlapping area; and
host the joint anchor graph for a shared artificial reality session between the first device and the at least one other device.

14. The system of claim 13, wherein the instructions further comprise instructions for:
receiving pose data from the first device;
tracking a location of the first device with respect to the joint anchor graph based on the pose data; and
sending the tracked location of the first device to the at least one other device.

15. The system of claim 13, wherein generating the map data comprises:
determining a plurality of three-dimensional (3D) points from the map data;
establishing a plurality of anchor points based on the plurality of 3D points;
selecting a subset of the plurality of anchor points, wherein creating the joint anchor graph comprises overlapping one or more anchor points of the plurality of anchor points with one or more anchor points associated with the aggregate map data; and
discarding anchor points of the plurality of anchor points not selected in the subset.

16. The system of claim 15, wherein the step of selecting the subset of the plurality of anchor points is based on a viewpoint of the environment.

17. The system of claim 13, wherein the real-time data received from the first device is encrypted, and creating the joint anchor graph further comprises:
receiving, from the first device, a key for decrypting the encrypted real-time data; and
decrypting the encrypted real-time data using the key.

18. The system of claim 13, wherein the joint anchor graph represents overlapping public areas of environments of the first device and the at least one other device.

19. The system of claim 13, wherein the joint anchor graph comprises a globally consistent model that represents non-overlapping areas of the environments of the first device and the at least one other device that have been spatially transformed for merging.

20. A non-transitory computer-readable medium comprising one or more computer-executable instructions that, when executed by at least one processor of a computing device, cause the computing device to:
receive, from a first device in an environment, real-time data associated with the environment;
generate map data for the environment based on the real-time data;

create, by merging the map data of the first device with aggregate map data associated with at least one other device, a joint anchor graph that is free of identifiable information, wherein the identifiable information is omitted from the joint anchor graph by:
   determining an overlapping area between the map data of the first device and the aggregate map data,
   determining, based on at least the overlapping area, the identifiable information, wherein the identifiable information corresponds to a non-overlapping area,
   discarding at least a portion of the map data of the first device corresponding to the non-overlapping area, and
   spatially transforming a remaining portion of the map data of the first device corresponding to the non-overlapping area; and
host the joint anchor graph for a shared artificial reality session between the first device and the at least one other device.

\* \* \* \* \*